United States Patent Office 3,452,050
Patented June 24, 1969

3,452,050
ESTERS OF THIOACONIC ACID
Francois T. Bruderlein, Montreal, Quebec, Canada, assignor to American Home Products Corporation, New York, N.Y., a corporation of Delaware
No Drawing. Filed Apr. 8, 1966, Ser. No. 541,074
Int. Cl. C07d 5/16; A61k 27/00; A01n 9/28
U.S. Cl. 260—343.6                13 Claims

---

ABSTRACT OF THE DISCLOSURE

This invention relates to compounds of the formula

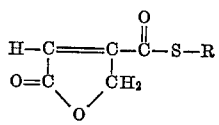

wherein R represents various aliphatic, aromatic and heterocyclic groups, said compounds possessing anti-fungal, anti-bacterial and anthelmintic activities.

---

The present invention relates to esters of thioaconic acid and to methods for preparing said esters.

The compounds of this invention are characterized by possessing anti-fungal activities to a very remarkable degree. They are particularly effective against pathogenic fungi such as *Microsporum gypseum, Trichophyton granulosum* and *Candida albicans*, inhibiting the growth of those fungi in concentrations of between 1:500,000 to 1:2,000,000. They also show activity against *Trichomonas foetus,* and they possess general antibacterial activities against a number of pathogenic bacteria. Furthermore, the compounds of this invention are also characterized by possessing anthelmintic activities, especially against *Nematospiroides dubius* and *Syphacia obvelata.*

As anti-fungal agents, the compounds of this invention may be formulated in the form of solutions or suspensions containing the active ingredient in concentrations of from 1:100,000 to 1:2,000,000, in suitable vehicles for topical use, and such solutions or suspensions may be applied to the infected area from one to several times a day as directed by the physician.

The compounds of this invention may be represented by the following general formula:

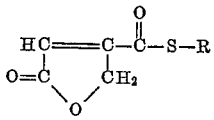

in which R represents an alkyl group consisting from one to ten carbon atoms; such as, for example, methyl, ethyl, propyl, butyl, amyl, isoamyl, hexyl, or decyl group. A cycloalkyl group such as, for example, the cyclopentyl, cyclohexyl, or bornyl groups; an aryl group, such as, for example, the phenyl, naphthyl or tetrahydronaphthyl group; a substituted phenyl group in which the substituents may be one or two lower alkyl groups, in the ortho, meta, or para positions, a carboxylic acid group, a nitro group, the acetamido group, a halogen, or the trifluoromethyl group, or one or two lower alkoxy groups in the ortho, meta, or para positions; or an aralkyl group such as, for example, the benzyl or a substituted benzyl group in which the substituents are lower alkyl groups, lower alkoxy groups, or halogen; or a heterocyclic alkyl group, such as, for example, the furfuryl or the 2-thiophenemethyl group, or, a heterocyclic group such as, for example, the 2-furyl or the 2-thienyl group.

More specifically, the compounds of this invention may be prepared by reacting an aconyl halide, such as, for example, aconyl chloride, with a suitable thiol, preferably in a non-polar solvent such as, for example, benzene or methyl ethyl ketone, within a temperature range from room temperature to the reflux temperatures of the mixture, preferably within a temperature range of from 60° C. to 100° C. In some cases it is preferable to add a few drops of sulfuric acid to the reaction mixture. The reaction is usually complete within a period of time of from 0.5 to 24 hours, and the reaction product is isolated from the reaction mixture either by filtration or by washing with water, separating the organic phase, drying, and evaporating the solvent.

The following examples will illustrate my invention:

EXAMPLE 1

Thioaconic acid phenyl ester

To 3.75 g. thiophenol (0.034 M) in 50 ml. of benzene 5 g. of aconyl chloride (prepared according to the method described by A. Funke et al. in Bull. Soc. Chim. 1950, p. 346) are added with stirring. The resultant reaction mixture is refluxed for 20 hours. then poured into water and the organic layer washed with water, dried with magnesium sulfate and finally concentrated to dryness. The semi-solid residue is crystallized from ethanol to yield the title compound with M.P. 111–114° C.

In the same manner, but using 1-naphthylthiol, 2-naphthylthiol, 1,2,3,4-tetrahydro-5-naphthylthiol, 1,2,3,4-tetrahydro - 6 - naphthylthiol, o-tolylthiol, m-tolylthiol, p-tolylthiolphenol, o-ethylthiophenol, p-ethylthiophenol, 2,4-dimethylthiophenol, p,t-butylthiophenol, o-nitrothiophenol, m-nitrothiophenol, p-nitrothiophenol, p-acetamidothiophenol, p - fluorothiophenol, m-chlorothiophenol, p-bromothiophenol, p-iodothiophenol, 2,5 - dichlorothiophenol, m - trifluoromethylthiophenol, m - methoxythiophenol, p-methoxythiophenol, 2,4-dimethoxythiophenol, or 3,4-dimethoxythiophenol, respectively, as starting materials instead of the thiophenol; the corresponding 1-naphthyl, 2-naphthyl, (M.P. 156–161° C.), 1,2,3,4-tetrahydro-5-naphthyl, 1,2,3,4-tetrahydro-6-naphthyl, o-tolyl, m-tolyl, p-tolyl, o-ethylphenyl, p-ethylphenyl, 2,4-dimethylphenyl (M.P. 74–76° C.) p-t-butylphenyl (M.P. 115–118° C.), o-nitrophenyl, m-nitrophenyl, p-nitrophenyl (M.P. 156–159° C.), p-acetamidophenyl, p-fluorophenyl, m-chlorophenyl, p-bromophenyl (M.P. 144–147° C.), p-iodophenyl, 2,5-dichlorophenyl, m-trifluoromethylphenyl, m-methoxyphenyl, p-methoxyphenyl, 2,4-dimethoxyphenyl, and 3,4-dimethoxyphenyl esters of thioaconic acid are respectively obtained.

EXAMPLE 2

Thioaconic acid o-carboxy phenyl ester

To 2.1 g. of thiosalicyclic acid (0.014 M) in 20 ml. of benzene and 1 drop of sulfuric acid 2.2 g. of aconyl chloride (0.015 M) are added with stirring. The resulting mixture is refluxed for 4 hours, poured into water and extracted with chloroform. The organic layer is dried with magnesium sulfate and evaporated to dryness. The residual oil is crystallized from ethanol to yield the title compound with M.P. 147–148° C.

EXAMPLE 3

Thioaconic acid benzyl ester

To 2 g. of benzyl mercaptan (0.016 M) in 25 ml. of benzene 2.5 g. of aconyl chloride (0.016 M) are added with stirring and the reaction mixture is refluxed for 20 hours. After cooling, the precipitate is filtered and recrystallized from ethanol to yield the title compound, with M.P. 79–82° C.

In the same manner, but using m-methylbenzyl mercaptan o-ethylbenzyl mercaptan, p-dodecylbenzyl mercaptan, p-methoxybenzyl mercaptan, 2,4-dimethoxybenzyl mercaptan, p-chlorobenzyl mercaptan, p-bromobenzyl mercaptan, respectively, as starting materials, the corresponding m-methylbenzyl, o-ethylbenzyl, p-dodecyclbenzyl, p-chlorobenzyl, p-methoxybenzyl, 2,4 - dimethoxybenzyl, p-chlorobenzyl (M.P. 90–93° C.), and p-bromobenzyl esters of thioaconic acid are respectively obtained.

EXAMPLE 4

Thioaconic acid furfuryl ester

To 2 g. of 2-furan methanethiol (0.0175 M) in 25 ml. of benzene 2.6 g. of aconyl chloride (0.0175 M) are added with stirring. The reacted mixture is refluxed for 20 hours and poured into water and the organic layer washed with water, dried with magnesium sulfate and finally concentrated to dryness. The semi-solid residue is crystallized from ethanol to yield the title compound, M.P. 78–79° C.

In the same manner, but using 2-thiophenemethanethiol 2-furanthiol or 2-thiophenethiol, respectively, as starting materials instead of 2-furan methanethiol, the corresponding 2-thiophenemethyl, 2-furyl, and 2-thienyl esters of thioaconic acid are respectively obtained.

EXAMPLE 5

Thioaconic acid n-decyl ester

To 2.39 g. of 1-decanethiol (0.0137 M) in 20 ml. of benzene 20 g. of aconyl chloride (0.0137 M) are added with stirring. The reaction mixture is refluxed for 20 hours poured into water. The organic layer is washed with water, dried with magnesium sulfate and finally concentrated to dryness. The solid residue is crystallized from ethanol to yield the title compound, M.P. 64–65° C.

EXAMPLE 6

Thioaconic acid isoamyl ester

To 1.43 g. of 3-methyl-1-butanethiol (0.0137 M) in 20 ml. of benezene 2.0 g. of aconyl chloride (0.0137 M) are added with stirring. The reaction mixture is refluxed for 20 hours and poured into water. The organic layer is washed with water, dried with magnesium sulfate and concentrated to dryness. The solid residue is crystallized from ethanol to yield the title compound, M.P. 51–52° C.

In the same manner, but using methanethiol, ethanethiol, n-propanethiol, n-butanethiol, n-pentanethiol, n-hexanethiol, cyclopentanethiol, cyclohexanethiol, or 2-camphanethiol respectively as starting materials instead of 3-methyl-1-butanethiol, the corresponding methyl, ethyl, n-propyl, n-butyl, n-amyl, n-hexyl, cyclopentyl cyclohexyl, and 2-bornyl esters of thioaconic acid are respectively obtained.

I claim:
1. A compound selected from those of the formula

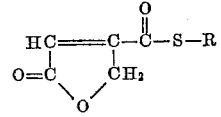

wherein R is selected from the group which consists of alkyl containing from one to ten carbon atoms; phenyl; substituted phenyl in which the substituents may be one or two lower alkyl groups in the ortho, meta or para positions, carboxyl, nitro group, acetamido group, halogen, trifluoromethyl, or one or two lower alkoxy groups in the ortho, meta or para positions; naphthyl; benzyl; substituted benzyl in which the substituents are lower alkyl, lower alkoxy or halogen; and furylmethyl.

2. The phenyl ester of thioaconic acid.
3. The 2-naphthyl ester of thioaconic acid.
4. The 2,4-dimethylphenyl ester of thioaconic acid.
5. The p-t-butylphenyl ester of thioaconic acid.
6. The p-nitrophenyl ester of thioaconic acid.
7. The p-bromophenyl ester of thioaconic acid.
8. The o-carboxyphenyl ester of thioaconic acid.
9. The benzyl ester of thioaconic acid.
10. The p-chlorobenzyl ester of thioaconic acid.
11. The furfuryl ester of thioaconic acid.
12. The n-decyl ester of thioaconic acid.
13. The isoamyl ester of thioaconic acid.

References Cited

UNITED STATES PATENTS 3,382,251   5/1968   Amiard et al. _____ 260—327

ALEX MAZEL, *Primary Examiner.*

J. A. NARCAVAGE, *Assistant Examiner.*

U.S. Cl. X.R.

260—999